United States Patent [19]

Fukuda et al.

[11] Patent Number: 5,404,389
[45] Date of Patent: Apr. 4, 1995

[54] SWITCHING SYSTEM AND SUBSCRIBER'S CIRCUIT CONTROLLING APPARATUS

[75] Inventors: Yasushi Fukuda, Tokyo; Masataka Takano; Setsuo Takahashi, both of Yokohama, all of Japan

[73] Assignee: Hitachi, Ltd., Tokyo, Japan

[21] Appl. No.: 992,535

[22] Filed: Dec. 17, 1992

[30] Foreign Application Priority Data

Dec. 17, 1991 [JP] Japan .................................. 3-333565

[51] Int. Cl.6 .......................... H04M 1/24; H04M 3/22
[52] U.S. Cl. .......................................... 379/27; 379/29; 379/32; 379/33
[58] Field of Search ....................... 379/1, 5, 6, 27, 29, 379/32, 33

[56] References Cited

U.S. PATENT DOCUMENTS

| | | | |
|---|---|---|---|
| 4,694,482 | 9/1987 | Reesor et al. ........................... | 379/27 |
| 4,741,017 | 4/1988 | Parsons et al. .......................... | 379/32 |
| 4,953,195 | 8/1990 | Ikemori ................................... | 379/33 |
| 5,001,740 | 3/1991 | Takano et al. ........................... | 379/1 |
| 5,007,080 | 4/1991 | MacMillan et al. .................... | 379/32 |
| 5,241,579 | 8/1993 | Kim et al. ............................... | 379/33 |

*Primary Examiner*—Stephen Chin
*Assistant Examiner*—Vijay Shankar
*Attorney, Agent, or Firm*—Antonelli, Terry, Stout & Kraus

[57] ABSTRACT

A switching system which includes subscriber's circuit device connected to terminals and a subscriber's circuit controlling apparatus between a host apparatus and subscriber's circuit devices for controlling the subscriber's circuit devices in accordance with a control order corresponding to control information from the host apparatus. Each of the subscriber's circuit controlling apparatuses includes an order processing unit which analyzes control information which is transmitted from the host apparatus for comparing the received control information with last received control information and transmits a control order to the subscriber's circuit devices. The order processing unit transmits control orders a number of times to the subscriber's circuit devices and accepts a fault report, from the subscriber's circuit devices to retransmit a control order. The subscriber's circuit devices receive the control order a number of times for collating the control orders and outputs a fault report when in disagreement.

14 Claims, 12 Drawing Sheets

SWITCHING SYSTEM AND SUBSCRIBER'S CIRCUIT CONTROLLING APPARATUS

BACKGROUND OF THE INVENTION

The present invention relates to a subscriber's circuit controlling apparatus for a time division switching system which serves analog subscribers, and in particular to a subscriber's circuit controlling apparatus and a switching system for controlling subscriber's circuit devices based upon a random control system in response to control information from a host apparatus.

A conventional subscriber's circuit controlling apparatus for a time division switching system has been known as is described in "A Study Configuration of Small Capacity Speech Path System" the Institute of Electronics, Information and Communication Engineers (IEICE) autumn 1989. In the conventional, the subscriber's circuit controlling apparatus receives subscriber's circuit control information from a central control system in a host switching system and transfers an order to corresponding subscriber's circuit for controlling the same. Main functions of a subscriber's circuit controlling apparatus 1 are shown in Table 1.

TABLE 1

| FUNCTION NAMES | SUMMERY OF FUNCTIONS |
|---|---|
| LOOP STATE MONITORING | TO NOTIFY A CENTRAL PROCESSING DEVICE OF DETECTION OF LOOP IN ALL SUBSCRIBER'S CIRCUITS |
| MAINTENANCE MONITORING | TO MONITOR OPERATING STATE OF ALL SUBSCRIBER'S CIRCUITS AND TO NOTIFY AN ALARM |
| PAD/FILTER PROSETTING CONTROL | TO CONTROL PROSETTING OF VARIOUS FILTERS/PADS ON AND LOG SUBSCRIBER'S LINES |
| FIRST RINGING CONTROL | TO NOTIFY VARIOUS RINGING PATTERNS. TO CONTROL START FROM RINGING ON STATE. |
| TIME SLOT CONTROL | TO CONTROL CONNECTION/ DISCONNECTION BETWEEN A NETWORK AND EACH SUBSCRIBER'S CIRCUIT |
| RING TRIP | TO IMMEDIATELY STOP RINGING AFTER RESPONDING TO CALLING |
| POW-ON | TO CONTROL SWITCHING BETWEEN OPERATIVE AND INOPERATIVE STATES OF SUBSCRIBER'S CIRCUIT |
| DUAL SYSTEM SWITCHING | TO SWITCH TO STAND-BY SYSTEM VALUE CURRENTLY OPERATIVE SYSTEM IS FAULTY IN DUPLEX REDUNDANT STRUCTURE |

As shown in Table 1, the subscriber's circuit controlling apparatus 1 performs detection of the loop of a subscriber's circuit and monitoring of maintenance information and executes the task of the control information corresponding to a result of the detection and monitoring. The subscriber's circuit controlling apparatus 1 transfers the control information to the subscriber's circuits in accordance with a control order representative of an instruction and the address of a subscriber's circuit from the central processing device 21. Types of control order are shown in Table 1 and codes corresponding to respective types are preliminarily allocated to the control orders.

Systems for controlling the communication between the subscriber's controlling apparatus and the subscriber's circuit devices include a cyclic control system in which the control information is time-division-multiplexed on a control bus for cyclically transferring control signals to the subscriber's circuit controlling apparatus and a random control system in which control information from a host switching system is analyzed and only necessary control information is edited so that a control signal is transferred to the subscriber's circuit device as shown in FIG. 9. Functions in two systems are compared with each other in Table 2.

TABLE 2

| ITEM | SYSTEM | | | |
|---|---|---|---|---|
| | CYCLID CONTROL SYSTEM | | RANDOM CONTROL SYSTEM | |
| PROCESSING CAPACITY TRANSFERRED EFFICIENCY | REDUNDANCY IS HIGH SINCE THE CONTROL INFORMATION IS CYCLICALLY TRANSFERRED WHETHER OR NOT HOST CONTROL INFORMATION IS ISSUED. | X | ORDER IS TRANSFERRED TO SUBSCRIBER'S CIRCUIT IN RESPONSE TO HOST APPARATUS CONTROL INFORMATION. | ○ |
| FUNCTION CONCENTRATION | FUNCTION CONCENTRATION TO CONTROLLING APPARATUS SIDE IS POSSIBLE. IT SUFFICES FOR SUBSCRIBER'S CIRCUIT TO HAVE CAPABILITY OF SIMPLY RECOGNIZING AND EXECUTING RECEIVED ORDER. | ○ | SAME AS LEFT COLUMN | ○ |
| IMMUNITY TO INTERMITTENT FAULT | ORDERS AFE CYCLICALLY TRANSFERRED. MALFUNCTION ON INTERMITTENT FAULT CAN BE RECOVERED IN NEXT CYCLE. | ○ | IF THERE IS NO DEVICE TO PREVENT INTERMITTENT FAULT IN TRANSFER PROCEDURE, MALFUNCTION DUE TO THE INTERMITTENT FAULT CAN NOT BE PREVENTED. MALFUNCTION PREVENTION PROCEDURE IS NECESSARY. | Δ |
| ADAPTABILITY ON ORDER CONGESTION | ENHANCEMENT IN WRITE SPEED OF STATE STORING MEMORY MAKES ADAPTATION EASIER. | ○ | MEANS FOR PREVENTING INFORMATION MISSING WHICH OTHERWISE OCCURS ON CONGESTION OF HOST ORDERS OR WHEN THE ORDER TRANSFER AND PROCESSING CAPACITY IS LOWERED.(ORDER QUEUE BUFFER) | Δ |
| RELIABILITY | SINCE DUAL REDUNDANT STRUCTURE IS ADOPTED. | ○ | DEVICE IS NECESSARY WHICH CAN CONTROL SYSTEM | Δ |

TABLE 2-continued

| ITEM | SYSTEM | | | |
| --- | --- | --- | --- | --- |
| | CYCLID CONTROL SYSTEM | | RANDOM CONTROL SYSTEM | |
| | SYSTEM SWITCHING CONTROL IS EASY. | | SWITCHING WITHOUT DISCARDING OF ORDERS ALTHOUGH DUAL REDUNDANT STRUCTURE IS ADOPTED. | |
| FLEXIBILITY EXPANDABILITY | SINCE FIXED ALLOCATION TRANSFER IS PERFORMED, EXPANSION IS DIFFICULT. | X | EXPANSION IS EASY BY ONLY INCREASING THE NUMBER OF ORDER KINDS. | O |
| HARDWARE SCALE | THE SYSTEM CAN BE IMPLEMENTED BY LOGICAL HARDWARE. CONTROL OF STATE STORAGE MEMORY IS SLIGHTLY COMPLICATED. | Δ | THE SYSTEM CAN BE IMPLEMENTED BY LOGICAL HARDWARE. HARDWARE SUCH AS QUEUE BUFFER IS NEEDED. | Δ |

As shown in Table 2, the cyclic control system has heretofore been adopted to cope with malfunctions (intermittent faults) which occurs due to noise which is generated on a common control bus for the linkage between the subscriber's circuit controlling apparatus and the subscriber's circuits when a hot-line job of a subscriber's circuit device is inserted or removed. In other words, even if malfunction temporarily occurs due to noise, the malfunction will not continue since a correct control signal is transmitted in the next cycle. In contrast to this, a malfunction may occur in the random control system.

The cyclic control system needs to cyclically transfer each control order to each subscriber's circuit device even when there is no access from the host switching system. Therefore, the cyclic control system has a high redundancy and a limited amount of control information. Accordingly, if the amount of control information is increased in association with an advancement in function of subscriber's circuit controlling apparatus and an increase in the number of subscriber's circuit devices, a higher information transfer rate or expandability of the control bus is needed for the cyclic control system to achieve a control order in which initial presetting control or diagnosis test control occurs at a low frequency and the amount of information is high. As a result of this, the cyclic control system becomes more complicated.

Although the random control system can cope with the increase in the amount of control information, it has problems in the above mentioned malfunction due to noise generated on insertion or removal of a plug of the subscriber's circuit board and missing of the control information occurring when the transfer and processing capacity is limited due to the increase in the amount of control information.

A problem arises that the control information is discarded on switching of systems if the subscriber's circuit controlling apparatus adopts the duplex system of redundant structure.

SUMMARY OF THE INVENTION

It is, therefore, an object of the present invention to provide a random control type subscriber's circuit controlling apparatus and a switching system which are capable of coping with the enhancement in the capability of the subscriber's circuit control and the increase in the amount of control information and of preventing malfunction due to noise, etc. from occurring.

It is another object of the present invention to provide a subscriber's circuit controlling apparatus which prevents missing of the control information when the control information transfer and processing capacity is limited.

It is a further object of the present invention to provide a subscriber's circuit controlling apparatus which is capable of switching systems without discarding the control information if the random control type subscriber's circuit controlling apparatus adopts the duplex redundant structure.

In order to accomplish the above mentioned object of the present invention, there is provided a switching system including a plurality of subscriber's circuit devices connected to terminals and having capabilities related with controlling of operation of the terminals, one or more host apparatuses having a capability of switching information from the terminals in accordance with the destination of the information for outputting control information; and a plurality of subscriber's circuit controlling apparatus connected with the host apparatuses and the subscriber's circuit devices for outputting control orders each corresponding to the control information from the host apparatuses to control the subscriber's circuit devices in accordance with the control order; characterized in that each of the subscriber's circuit controlling apparatus includes an order processing unit which analyzes received control information from the host apparatuses and compares the received control information with the last received control information and outputs the control order corresponding to the control information to the subscriber's circuit devices when they disagree; the order processing unit being adapted to transmit the control order a number of times, the subscriber's circuit devices being adapted to receive the control orders from the order processing unit a number of times and to collate the control orders for outputting a fault report to the order processing unit when they disagree; and the order processing unit retransmitting the control orders when it receives the fault report from the subscriber's circuit devices.

The switching system may further include dedicated alarm lines which connect the subscriber's circuit devices with the subscriber's circuit controlling apparatuses for transmitting the fault report.

The order processing unit may transmit a read control order for reading the control order received by the subscriber's circuit device and determines whether or not the response of the read control order from the subscriber's circuit device agrees with the transmitted control order and retransmits the control order if they disagree.

The order processing unit may report a fault to the host apparatus when the order processing unit retransmits the control orders a predetermined number of times.

The order processing unit may further include an order queue buffer for storing therein control information from the host apparatus.

The order processing unit has a duplex redundant structure including operative and stand-by systems and the subscriber's circuit controlling apparatus further includes a dual port memory between the operative and stand-by systems. The dual port memory accumulates therein control information of an order queue buffer of the operative system on switching from the operative system to the stand-by system. The order processing unit further includes a memory controller for controlling the transmission of the control information from the order queue buffer to the dual port memory and vice versa.

The order processing unit may be used to monitor mounting of the subscriber's circuits on the subscriber's circuit devices and control a predetermined initial presetting corresponding to the type of subscriber's circuit when the mounting is detected.

A control line and data line, through which the control orders and data are respectively transferred between the subscriber's circuit devices and the subscriber's circuit controlling apparatus, may be provided. The order processing unit may further include diagnosing means for diagnostically testing the subscriber's circuit devices and an input unit for starting the diagnosing means in response to an instruction to start the diagnostic test.

The diagnosing means issues a control order to the subscriber's circuit device and thereafter transmits a read control order for reading a control order which is received by the subscriber's circuit device and determines whether or not the response to the read control order from the subscriber's circuit device agrees with the transmitted control order.

The diagnosing means instructs the subscriber's circuit device to return a data signal line and transmits a test pattern via the data signal line to perform a conduction test of the data signal line.

The diagnosing means further includes a test lead-in line for driving a relay between the subscriber's circuit devices and the subscriber's circuit controlling apparatuses. The subscriber's circuit device includes a loop making relay to connect the device to the test lead-in line and a off-hook detecting means detects the driving of the loop making relay and so reports the off-hook state. The diagnosing means drives the loop making relay via the test lead-in line to perform the off-hook detection test in response to an off-hook report from the off-hook detecting means.

Operation of the present invention will now be described.

The order processing unit of the subscriber's circuit controlling apparatus adopts a random control system in which it analyzes the control information received from the host apparatus and compares it with a last received control information and transmits a control order to the subscriber's circuit device when there is disagreement between the received control information and the last receive control information. The order processing unit transmits the control orders a number of times. The subscriber's circuit device collates the control orders, or executes then after it confirms the agreement therebetween and returns a fault report to the subscriber's circuit controlling apparatus if there is disagreement therebetween. The subscriber's circuit controlling apparatus accepts a fault report and retransmits the control order. Since the subscriber's circuit device executes the order after the retransmission procedure, it can relieve the order transfer when an intermittent fault such as a bit error occurs on the control bus between the controlling apparatus and the subscriber's circuit device and in the order transfer control unit of each apparatus and each device so that malfunction of the subscriber's circuit device can be prevented.

Since a read order is executed between the subscriber's circuit controlling apparatus and the subscriber's circuit devices, confirmation of normal execution of the control order and confirmation of correspondence of state control information held in the subscriber's circuit controlling apparatus to the state of the subscriber's circuit device to be controlled is carried out and the control order can be retransmitted if there is disagreement therebetween.

On switching of the systems of the subscriber's circuit controlling apparatus adopting the duplex redundant structure, the order queue is DMA transferred via the dual port memory from a currently operative order queue buffer to a newly operative order queue buffer. Since all of the currently operative order queue is copied to the newly operative system even if there is a difference between the storage conditions of both order queue buffers prior to switching, system switching can be achieved without discarding all order queues.

Since the subscriber's circuit controlling apparatus constantly monitors the mounting of the subscriber's circuits on each of the subscriber's circuit devices to be controlled, the subscriber's circuit controlling apparatus (which need not accept the control information from the host apparatus) can itself execute the initial presetting of the subscriber's circuit device suitable for the type of the subscriber's circuit by immediately detecting that a subscriber's circuit is newly mounted to identify the type of the mounted subscriber's circuit.

If all the subscriber's circuit devices having the same type are simultaneously incorporated in the system, the type of the subscriber's circuits is identified so that the initial presetting can be efficiently achieved by broadcasting the type order.

The input unit may accept an instruction of the diagnosis test for activating the diagnosing means and the diagnosing means can conduct diagnostic testing of the subscriber's circuit devices.

DESCRIPTION OF THE PREFERRED EMBODIMENTS

The present invention will be described in detail by way of embodiments with reference to drawings.

Figure 8:
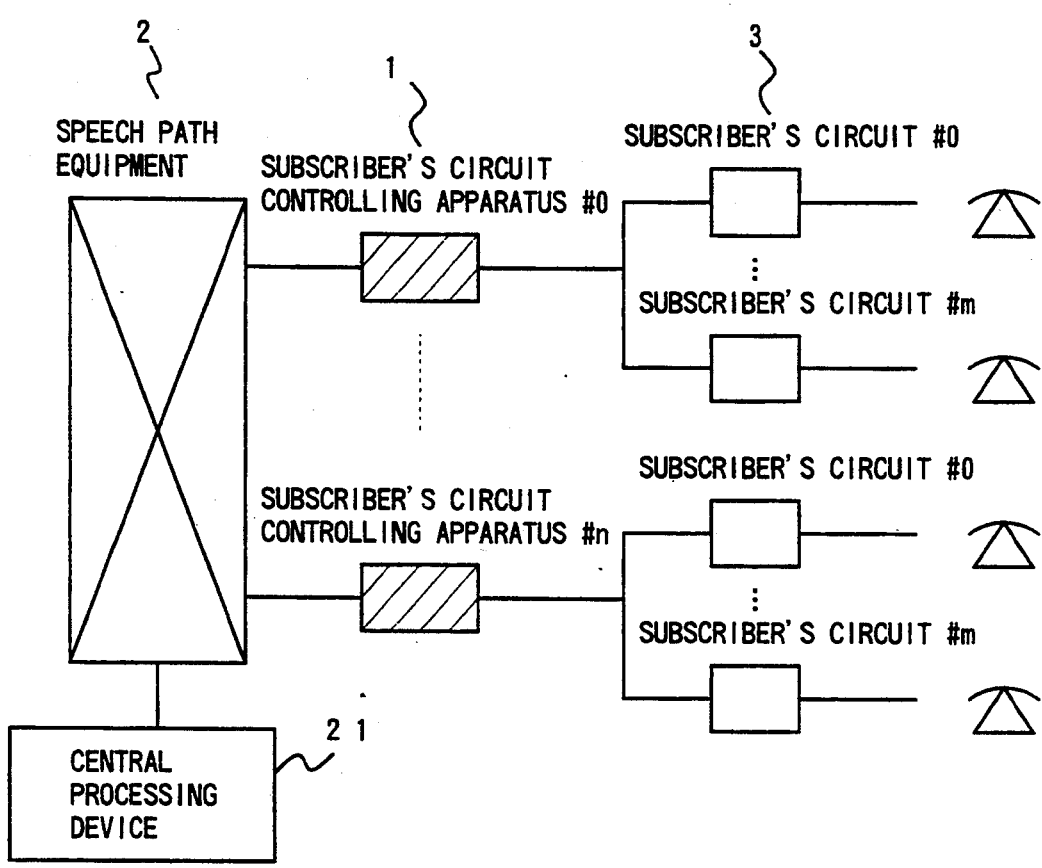
FIG. 8 is a schematic view showing the structure of a switching system.
Figure 9:
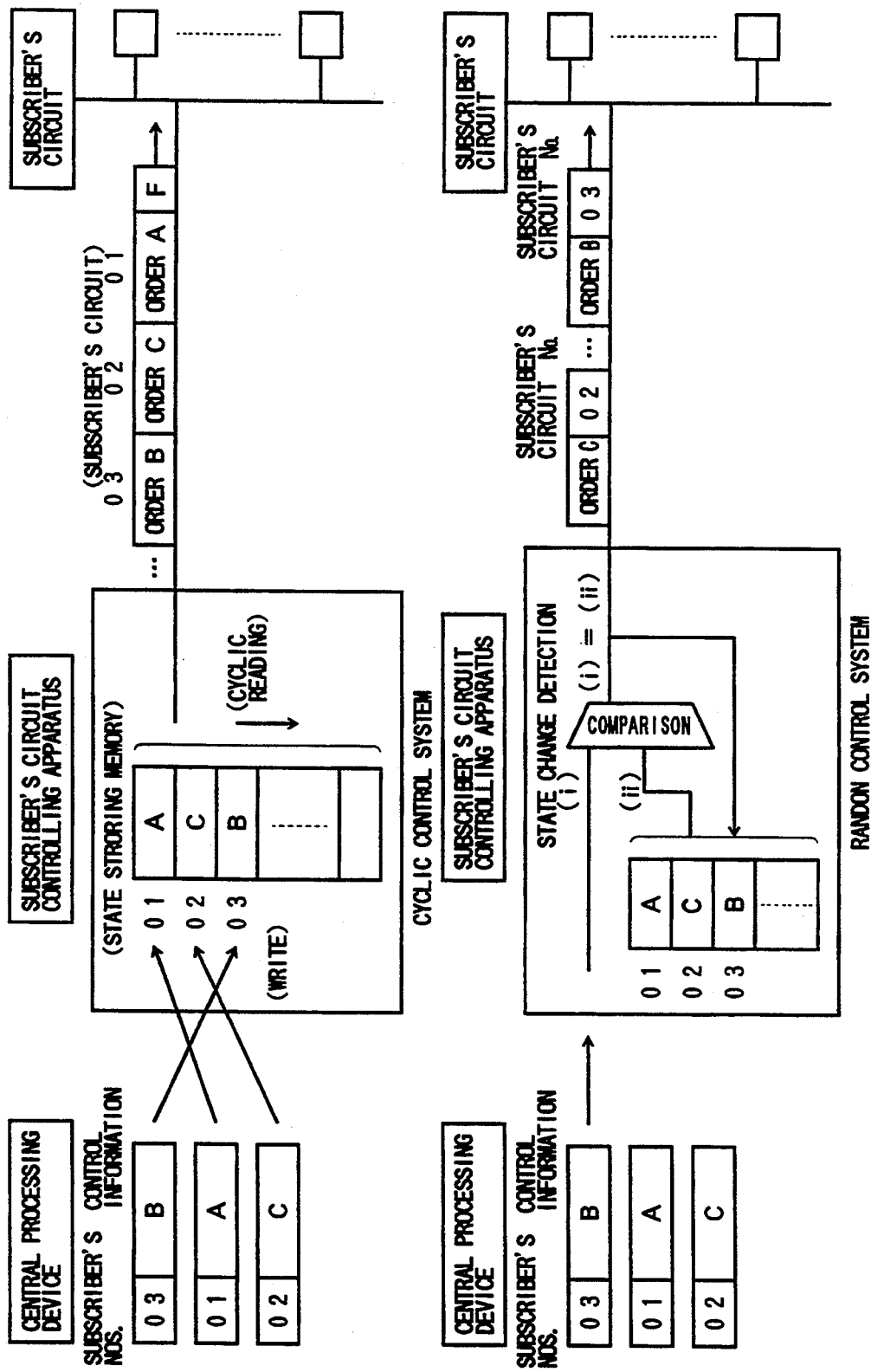
FIG. 9 is a schematic view showing the configuration of the subscriber's circuit controlling apparatuses.

Referring now to FIG. 8, there is shown the overall structure of a switching system. Subscriber's circuit controlling apparatuses 1 are dedicated interfaces between a speech path equipment 2 and subscriber's circuits 3 for controlling the subscriber's circuits in accordance with an instruction from a central processing device 21 of the speech path equipment 2. Each of the subscriber's circuit controlling apparatuses are connected with a plurality of subscriber's circuit devices via a common control bus through which control information is transferred. Separate highways for transferring data are provided therebetween. The subscriber's circuit can be connected to terminal devices such as subscriber's telephone sets, data terminals, facsimile machines etc. A plurality of subscriber's circuit devices can be connected to each of the subscriber's circuit controlling apparatuses 1. The speech path equipment 2 is a host apparatus such as repeater and switching apparatus for switching speech paths among a plurality of subscriber's terminals. The central processing device 21 is connected to the speech path equipment 2 for outputting instructions to subscriber's circuit controlling apparatuses 1. Other speech path equipment can be connected to the speech path equipment 2 so that they are of a duplex redundant structure including systems 0/1.

The structure of each subscriber's circuit controlling apparatus 1 will now be described with reference to the functional block diagram of FIG. 1.

Figure 1:
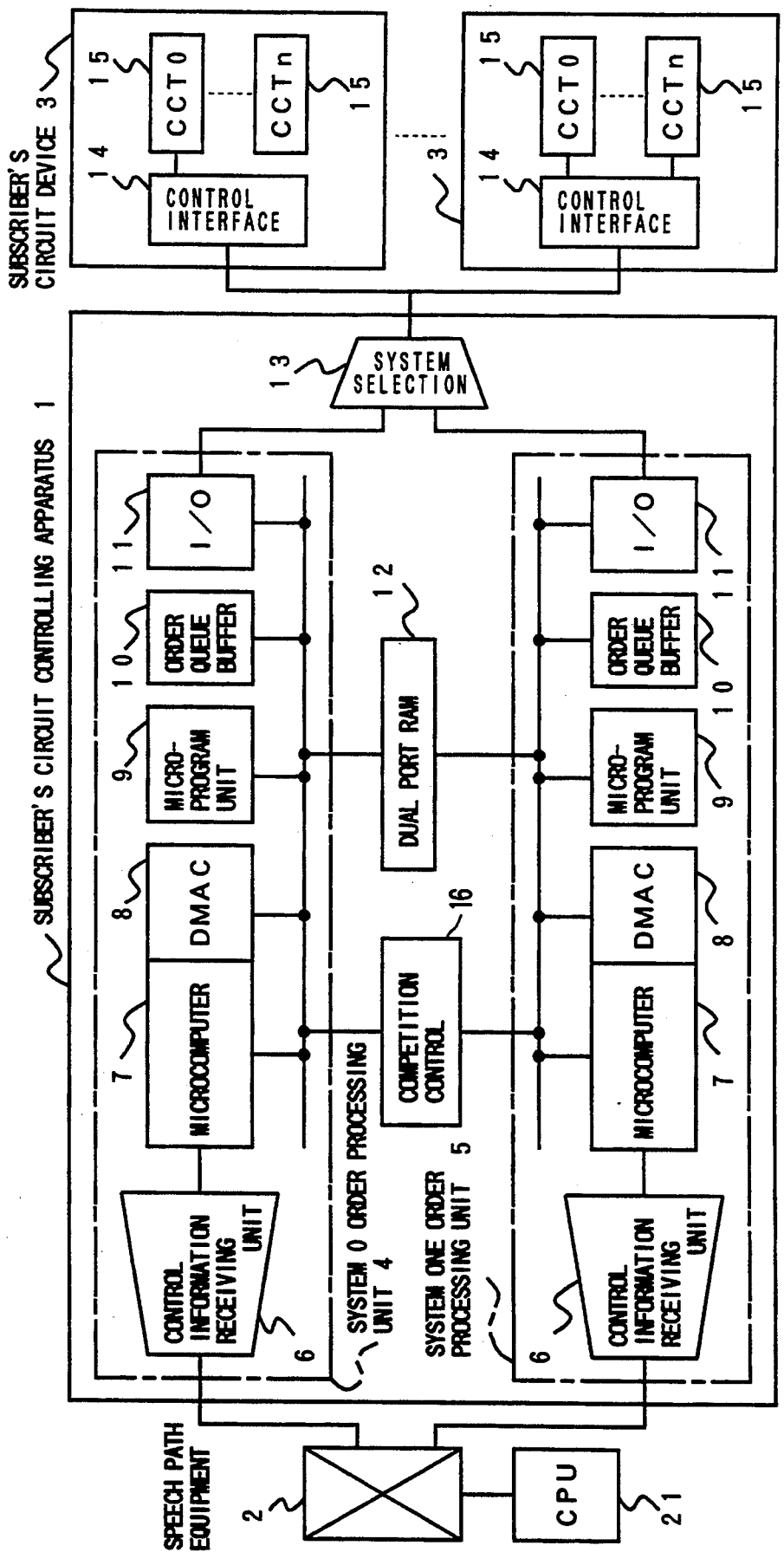
FIG. 1 is a block diagram showing data processing functions of a subscriber's circuit controlling apparatus.

In FIG. 1, the subscriber's circuit controlling apparatus 1 is capable of receiving control orders fed from the speech path equipment 2 to subscriber's circuits 3 for controlling the plurality of subscriber's circuit devices 3 and is of a redundant structure including a system 1 order processing unit 4 and a system 0 order processing unit 5 as is similar to the host apparatus. The systems 0/1 of the speech path equipment 2 and the systems 0/1 of the order processing units are of an associated mode in which the same systems of the host apparatus and order processing units are connected to each other. The systems of order processing units of the subscriber's circuit controlling apparatus 1 are switched. Accordingly, when the system 0 host apparatus is ACT (active or operative), the system 0 order unit is ACT. The system 0 is selected by a system selection circuit 13 so that control orders are transferred to each subscriber's circuit device via the system 0 order processing unit. At this time, the system 1 is a SBY (standby) system. When a fault occurs, the system 1 is switched into ACT in accordance with a switching instruction from the host apparatus.

Each of the order processing units comprises a control information receiving unit 6, a microcomputer circuit 7, a direct memory access controller (DMAC) 8, a microprogram unit 9, an order queue buffer 10 and an I/O control unit 11.

The control information receiving unit 6 receives control information from the speech path equipment 2 and transmits it to the microcomputer circuit 7. The control information receiving unit 6 includes a memory for storing therein subscriber's circuit controlling states. The state storing memory stores therein control information from the host apparatus corresponding to each subscriber's circuit. The state storing memory may be included in the control information receiving unit 6 as mentioned above or alternatively may be included in a unit other than the control information receiving unit 6 in the order processing unit. When the control information receiving unit 6 receives control information from the host apparatus, the unit 6 searches the state storing memory in accordance with an address provided for the control information for detecting a change in state. The term "a change in state" used herein means a change in the type of control information from the host apparatus. The receiving unit 6 receives the changed control information and writes the type of control information in the state storing memory and simultaneously identifies the type of control information and notifies the microcomputer circuit 7 of the control information at a predetermined interruption level corresponding to the type of control information. The control information unit 6 accumulates the received control information in an order queue buffer 10 while the microcomputer circuit 7 is executing other operations. This will be described hereafter with reference to an operation in a case in which control information is missed.

In response to the control information which is received by the control information receiving unit 6, the microcomputer circuit 7 executes the actual order operation in accordance with a processing program of each control information stored in a microprogram unit 9 for feeding a control order to the subscriber's circuit device 3. The processing programs having functions shown in the above mentioned Table 1 are preliminarily stored in the microprogram unit 9. The order queue buffer 10 is a storage means which temporarily stores therein the received control information from the host apparatus if the microcomputer 7 can not immediately process the received control information and outputs control information in order from the first input control information like a FIFO memory. The DMAC 8 controls the transfer of control information between a dual port RAM 12 and the order queue buffer 10 on switching of the systems. The I/O control unit 11 controls input/output of orders to and from the subscriber's circuit device.

Each of the subscriber's circuit controlling apparatuses 1 further includes the dual port RAM unit 12 for relaying the order queue transfer between systems, a competition control unit 16 for controlling the competition of access to the dual port RAM unit 12 and the system selection circuit 13 which is instructed by the host apparatus for selecting the ACT system which is to be connected to the subscriber's circuit. The dual port RAM unit 12 is located between the system 0 and 1 order processing units for temporarily transferring the control information via the dual port RAM 12 when the control information is transferred from the order queue buffer of the ACT system to the order queue buffer of the SBY system for preventing the control information from being discarded. This will be described hereafter with reference to the operation for preventing the control information from being discarded on switching of systems.

Now, control operation of the subscriber's circuit controls will be described.

The subscriber's circuit controlling apparatuses in the present embodiment control the subscriber's circuits in accordance with the random control system. If control information is provided from the host apparatus, the control information receiving unit 6 detects a change in state by searching the state storing memory in accordance with the address provided for the control information. The control information receiving unit 6 receives the changed control information and writes the type of control memory in the state storing memory and analyzes the control information and reports the result of analysis to the microcomputer circuit 7.

When the microcomputer circuit 7 receives the report, it executes the actual order processing based upon the processing program of each control information stored by the microprogram unit 9 in accordance with the control information received in the control information receiving unit 6. In other words, each order is fed from the I/O control unit 11 to the subscriber's circuit which is specified by the control information.

Now, prevention of malfunction due to noise which is generated on insertion and removal of a hot-line job of the subscriber's circuit will be described.

The check systems shown in Table 3 can prevent the subscriber's circuit from malfunctioning due to unwanted order change if a fault occurs due to noise.

TABLE 3

| | VERTICAL/HORIZONTAL PARITY CHECK | | CRC SYSTEM | |
| --- | --- | --- | --- | --- |
| HARDWARE SCALE | IF ONLY VERTICAL PARITY CHECK SYSTEM IS IMPLEMENTED, THE HARDWARE MAY BE SMALL SCALE. IF VERTICAL AND HORIZONTAL PARITY CHECK SYSTEM IS IMPLEMENTED, THE HARDWARE BECOMES LARGE SCALE. | X | MIDDLE SCALE OPERATION CIRCUITS ARE NECESSARY FOR BOTH TRANSMITTING AND RECEIVING SIDES. CIRCUITS ARE SLIGHTLY COMPLICATED. | △ |
| PROCESSING RATE | ACCUMULATION OF n × m BITS IN VERTICAL/ HORIZONTAL DIRECTIONS IS NECESSARY. | △ | PROCESSING AND TRANSFER PERIODS OF TIME IN TRANSMITTING AND RECEIVING DEVICES ARE EQUAL TO THOSE IN ECHO-CHECK SYSTEM AND DUAL TRANSMISSION CHECK SYSTEM. | ○ |
| CHECK CAPACITY | EVEN NUMBER BIT ERROR IN BOTH VERTICAL/HORIZONTAL DIRECTIONS CAN NOT BE DETECTED. | △ | CAPABILITY TO DETECT BURST ERROR IS HIGH. | ○ |
| SUITABILITY FOR SUBSCRIBER'S CIRCUIT CONTROL | THIS SYSTEM IS NOT SUITABLE FOR BURST ERROR DETECTION AND EVEN NUMBER BIT ERROR DETECTION. | X | ALTHOUGH CHECK CAPABILITY, PROCESSING CAPACITY AND RATE ARE EXCELLENT, THE CIRCUIT CONFIGURATION IS DISADVANTAGEOUSLY COMPLICATED. | △ |
| EVALUATION | X | | △ | |
| | ECHO CHECK SYSTEM | | DUAL TRANSMISSION CHECK SYSTEM | |
| HARDWARE SCALE | COMPARING AND COLLATING CIRCUITS ARE CONCENTRATED IN THE TRANSMITTING SIDE. THE CIRCUITS IN THE SIDE OF SUBSCRIBER'S CIRCUITS WHICH ARE n TIMES AS MANY AS TRANSMITTERS ARE SMALL SCALE. | △ | TRANSFER CONTROL CIRCUITS AND COLLATION CIRCUIT ARE NECESSARY IN TRANSMITTING AND RECEIVING SIDES. RESPECTIVELY. CIRCUIT CONFIGURATION IS SIMPLE. | △ |
| PROCESSING RATE | TIME FOR WAITING IN THE RECEIVING SIDE FOR A RESULT OF COMPARISON MADE IN THE TRANSMITTING SIDE IS NECESSARY. PROCESSING TIME IS SHORT IN NO WAITING SYSTEM. HOWEVER, THIS SYSTEM IS NOT SUITABLE FOR SUBSCRIBER'S CIRCUIT CONTROL. | △ | WAITING IN THE TRANSMITTING SIDE IS NECESSARY FOR THE NOTIFICATION OF THE RESULT TO THE TRANSMITTING SIDE AFTER COLLATION AND CHECK IN RECEIVING SIDE. DOUBLE TRANSFER TIME IS TAKEN OWING TO DUAL TRANSMISSION. | △ |
| CHECK CAPACITY | SAME AS LEFT | ○ | SAME AS LEFT | ○ |
| SUITABILITY FOR SUBSCRIBER'S CIRCUIT CONTROL | TRANSFER ECHO CHECK OF DATA SELECTED PRIOR TO SELECTING OF CIRCUIT TO BE CONTROLLED IS IMPOSSIBLE OWING TO 1:n CONTROL. | X | ALTHOUGH PROCESSING IS SLIGHTLY SLOW, THE SYSTEM IS SUITABLE FOR BURST ERROR DETECTION. CIRCUIT CONFIGURATION CIRCUIT CONFIGURATION IS SIMPLE. | ○ |

TABLE 3-continued

| EVALUATION | X | O |
|---|---|---|

One of the check systems shown in Table 3 may be combined with the confirmation operation by the state reading which will be described hereafter. Among four check systems shown in Table 3, the two times transmission check system is preferable in view of it's ability to detect burst error, processing ability in subscriber control procedure and simple hardware configuration.

Prevention of malfunction due to noise generated on insertion or removal of a subscriber's circuit board will be described by way of a case in which the two times transmission check system is adopted with reference to FIGS. 2, 3 and 4.

Figure 2:
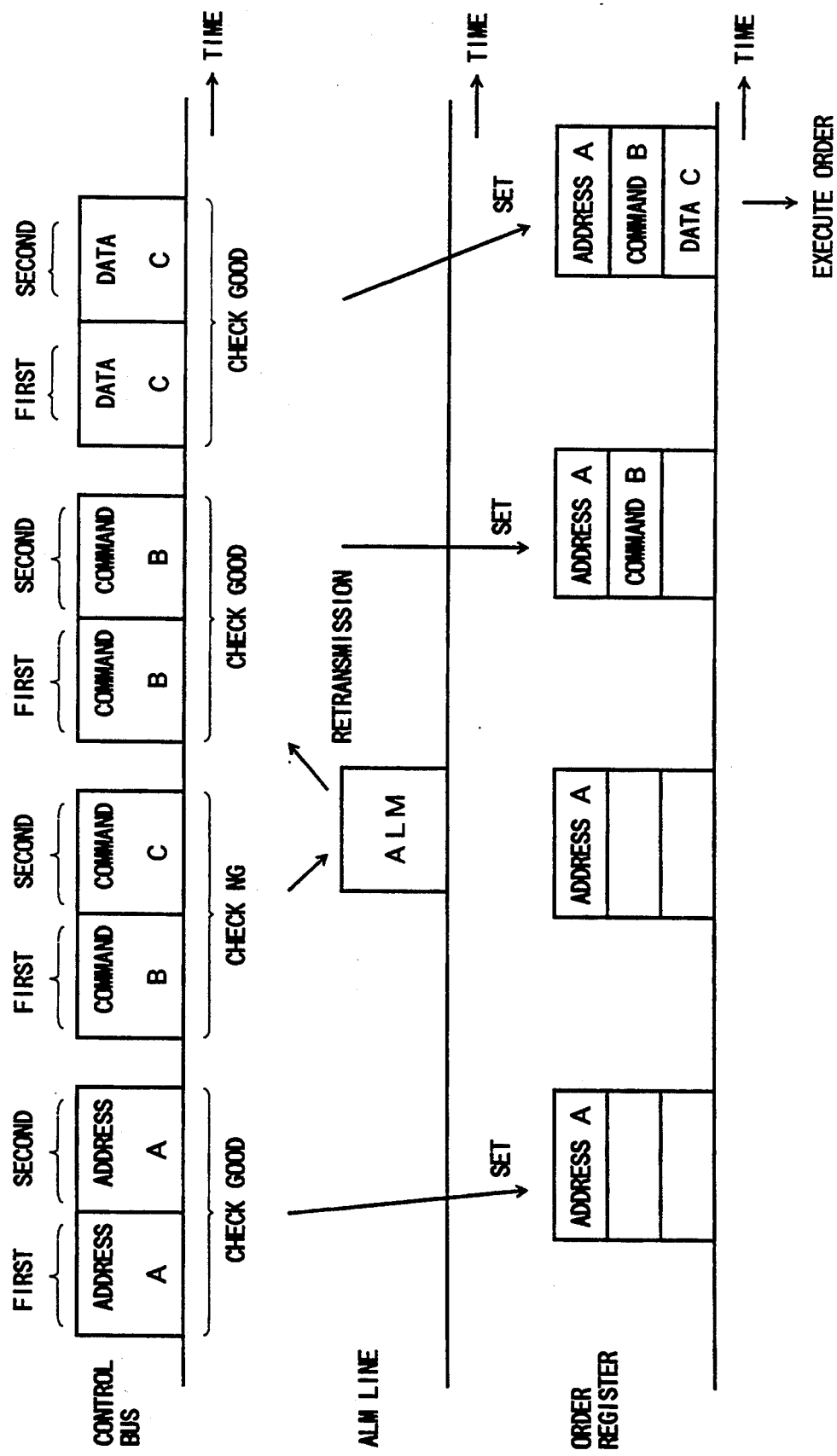
FIG. 2 is a timing chart (1) showing an order transfer on a subscriber's circuit control bus (on an intermittent fault)
Figure 3:
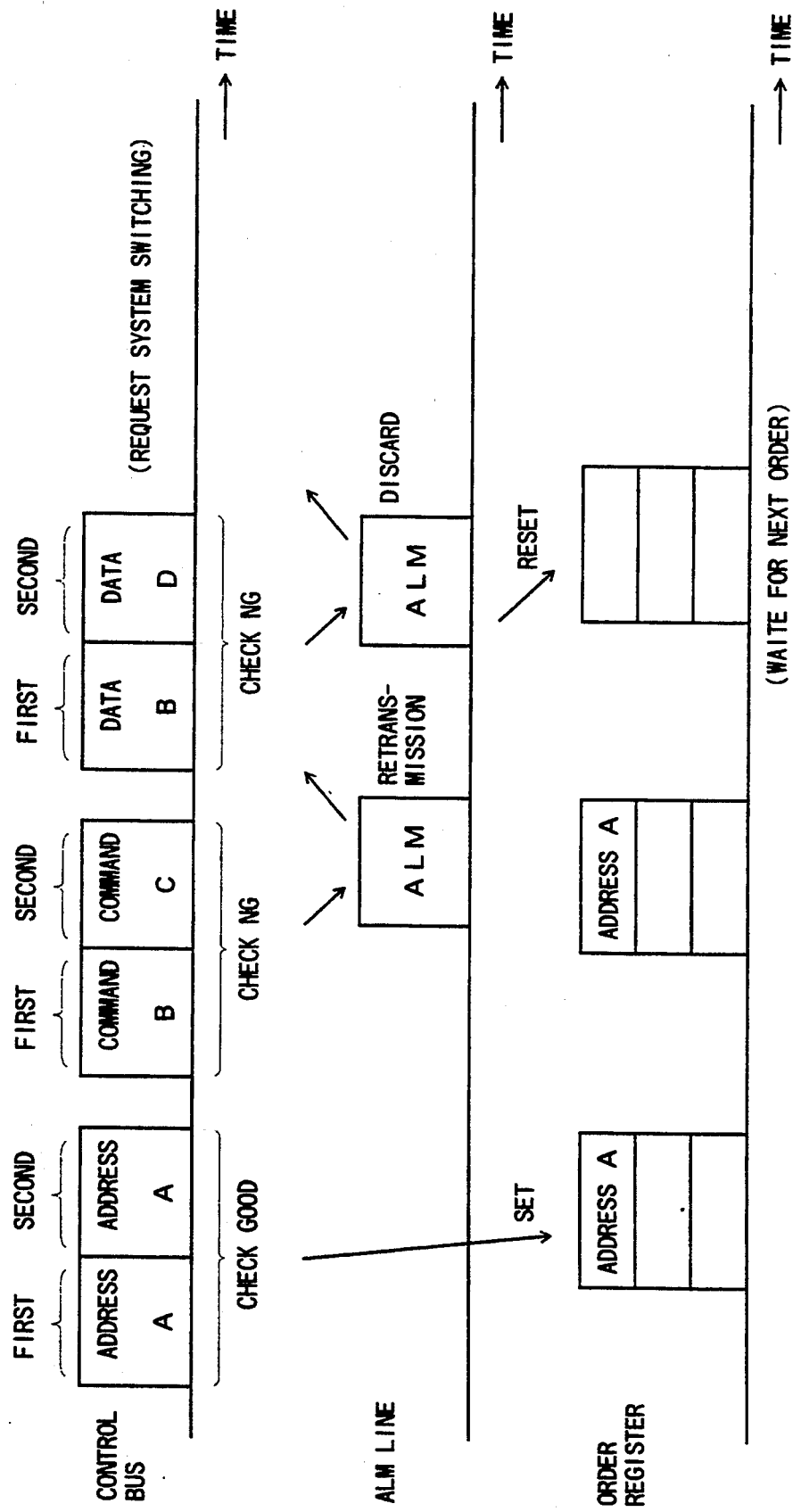
FIG. 3 is a timing chart (2) showing an order transfer on the subscriber's circuit control bus (on a permanent fault)
Figure 4:
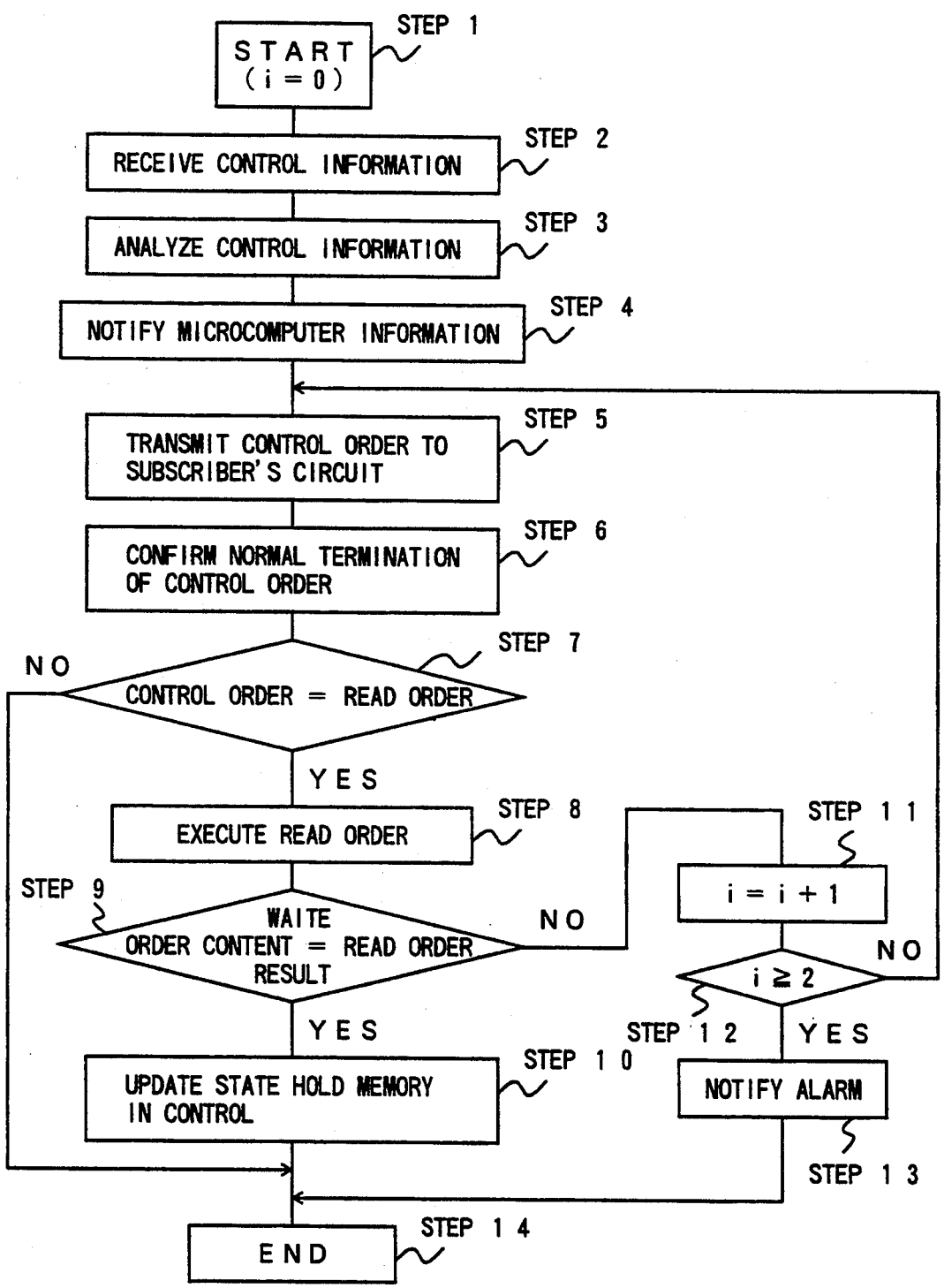
FIG. 4 is a flow chart showing a procedure to confirm a control order to a subscriber's circuit device.

Referring now to FIGS. 2 and 3, there are shown timing charts showing the transfer of control order between the subscriber's circuit controlling apparatus and the subscriber's circuit devices. FIG. 2 is a timing chart showing a case in which a transfer error occurs once due to noise generated by insertion or removal of a hot-line job and the order is recovered by retransmission. FIG. 3 is a timing chart showing a case in which transfer error successively occurs twice and the order is discarded. FIG. 4 is a flow chart showing an operation in which after a state writing order has been executed, an order for reading the same write state is executed in order to reconfirm the normal termination of the state writing order.

Each subscriber's circuit controlling apparatus is connected to the plurality of subscriber's circuit devices via a common control bus. When a subscriber's circuit device is inserted or removed to or from the system while the bus is in an active state, a transferring order is influenced by noise of about several nano seconds to several micro seconds, causing a malfunction in the receiver side.

In a case in which an order which is split into units such as address A, a command B and data C and is then transferred between the subscriber's circuit controlling apparatus and the plurality of subscriber's circuit devices, the subscriber's circuit controlling apparatus transmits each unit of the order to the subscriber's circuit device twice in a manner as shown in FIG. 2 in order to prevent this malfunction from occurring. The subscriber's circuit device checks each information unit. If the addresses agree, the subscriber's circuit device sets the agreed information units in an order register therein. If the check result does not show that they agree as a command B in FIG. 2, the subscriber's circuit device returns an alarm (ALM) to the subscriber's circuit controlling apparatus for requesting it to retransmit the command. The subscriber's circuit controlling apparatus which has received the alarm retransmits the command B and waits for a notice of check result from the subscriber's circuit device. If the check result is not informed within a given period of time, the subscriber's circuit control transfers next data C. After the receiving subscriber's circuit device receives and checks command B and data C, it stores them in the order register if they agree. At the time when all the address, command and data are stored in the order register, the subscriber's circuit device starts to execute this order. The alarm information may be transferred to the subscriber's circuit controlling apparatus from the subscriber's circuit device via the common control bus or alternatively, may be transferred through a dedicated alarm line which is provided separately from the common control bus.

FIG. 3 is a time chart showing a case in which faults occur twice. After the subscriber's circuit controlling apparatus normally receives an address A, transfer of the command is successively faulty twice so that the subscriber's circuit control receives alarm information from the subscriber's circuit device two times. Then the subscriber's circuit controlling apparatus determines that the fault is not intermittent, but permanent and requests the host apparatus to switch the systems. In other words, the receiving subscriber's circuit device resets the order register by two successive disagreements and is ready for the next order. The transmitting subscriber's circuit controlling apparatus stops the order transfer when it successively receives the alarm information twice and transfers the alarm information to the host apparatus for requesting it to switch the systems. Although a permanent fault is determined when the results of check successively disagree twice, the number of times of disagreements to determine the permanent fault may be three or more.

Even if wrong order information (address, command, data) is transferred to the subscriber's circuit device, the subscriber's circuit device may check each item of the order information and the subscriber's circuit control device may retransmit the information so that malfunction can be prevented. The subscriber's circuit control device can determine whether the fault is intermittent or permanent and can request the host apparatus to retransmit the order information on an intermittent fault and to switch the system on a permanent fault so that repetition of retransmission will not lower the processing capacity.

Other approaches to prevent the malfunction will be described. FIG. 4 shows a flow chart of a procedure for confirming an order normal termination included in a control data transfer sequence. The flow chart of FIG. 4 shows a program for executing a state reading control order to confirm that a state write control order is normally terminated after the subscriber's circuit controlling issues the state write control order to the subscriber's circuit device. A term "state write control order" used herein means one item of the control information which is output to the subscriber's circuit from the subscriber's circuit controlling apparatus and is used for writing the state of control order in a state register in the subscriber's circuit. The state read control order is used for reading the state of the state register of the subscriber's circuit by the subscriber's circuit controlling apparatus for confirmation of the state of the state register.

When the control information receiving unit 6 receives control information from the host apparatus (step 2), it detects a change in state by searching the state storing memory in accordance with an address designated by the control information. The control information receiving unit 6 receives the changed control information and writes the type of the control information in the state storing memory, analyzes the control information (step 3) and interrupts the microcomputer circuit for notification (step 7).

When the microcomputer circuit 7 receives the notification, it executes the actual control information processing in accordance with the control information which was received by the control information receiving unit 6 and transmits each order via the I/O control unit to the subscriber's circuit to which the control information is fed (step 5). The microcomputer circuit 7 confirms that the control order is normally terminated (step 6). The microcomputer circuit 7 determines whether or not the control order is the state write order to the subscriber's circuit (step 7), and executes the state read order for the same address if the control order is the state write order (step 8) and compares the content of the state write order with a result of the state read order (step 9). If they agree, the microcomputer circuit 7 updates the state hold memory for controlling the subscriber's circuit in the control information receiving unit 6 in the subscriber's circuit controlling apparatus (step 10). If the results of check successively disagree twice (steps 11 and 12), the microcomputer circuit 7 determines that the fault is permanent and notifies the host apparatus of an alarm (step 13) to request the host apparatus to switch the systems (step 14).

Even if the wrong order control is executed without being prevented by the dual transfer procedure shown in FIGS. 2 and 3, remedy is possible by confirming the execution of wrong order control by the state reading in the subscriber's circuit.

Now, approaches for solving a problem that control information is missed when the transfer processing capacity is limited due to an increase in the amount of the control information of the subscriber's circuit controlling apparatus will be described.

Missing of the control information will be studied with reference to a specification model shown below.

(1) interval of issuance of order to one subscriber's circuit: $y\mu s$/order
(2) average rate of transfer from subscriber's circuit controlling apparatus to subscriber's circuit per one order: x bytes [order kind (POW-ON, bus connected, PAD on/off, etc. . . .)]
(3) processing period of time per byte: $Z\mu s$/byte
(4) transfer fault occurrence rate: r %

The condition can be expressed by the following equation.

$$Z\mu s/byte \times X \text{ bytes } (1+\gamma) \leq y\mu s/order \qquad \text{EQUATION 1}$$

As is apparent from this equation, this condition may not be established if the processing period of time is long, the number of transferred bytes is large or the order issuance interval is short. In this case, the control information is missed since the transfer processing in the subscriber's circuit controlling apparatus is insufficient on congestion of simultaneous callings/disconnection, etc.

Therefore, in the present embodiment, the subscriber's circuit controlling apparatus is provided with an order queue buffer 10 which is storage means for storing the control information from the central processing device as shown in FIG. 1. The order queue buffer 10 consecutively stores queues on reception of the control information and consecutively performs transfer processing.

If the control information from the control processing device is increased so that the order queue buffer 10 has stored a predetermined number of queues, the above mentioned state read order in the control order transfer processing from the subscriber's circuit controlling apparatus to the subscriber's circuit is skipped in order to shorten the period of time taken to process each order. In this case, the microcomputer circuit 7 monitors the number of order queues in the order queue buffer 10. When the number of order queues reaches a predetermined queue number, the microcomputer circuit 7 instructs to stop transmission of the state read order. The number of queues at which the state read order is transmitted is preliminarily determined. Transmission of the state read order is restarted when the number of processing orders is reduced so that the number of queues reaches a predetermined number.

The above mentioned studied model is further added with items to study the effectiveness of the present embodiment.

(5) the number of necessary queue buffers: 1
(6) the number of threshold queues at which normal procedure is shifted to simplified procedure: $m\mu$ wherein the normal procedure means a procedure in which the state read control order is transmitted after the state write control order is transmitted, that is, collation and check is performed and the simplified procedure means a procedure in which the state read control order is not transmitted, that is, no collation and check is performed.
(7) the number of threshold queues at which the simplified procedure is shifted to the normal procedure: md
(8) the ratio of the number of the subscriber's circuit controlling apparatus orders to the number of items of the central processing device control information is assumed as 1:1 (=P)
(9) the average number of transferred bytes per subscriber control order: X1 bytes/order in normal procedure, X2 bytes/order in simplified procedure
(10) the minimum interval between transmissions of control information from the central processing device: $y\mu s$
(11) the transfer fault occurrence rate: $\gamma$
(12) transfer rate: $V\mu s$/byte The relationship between the control information issuance interval $y\mu s$ of the central processing device and the order transfer processing period of time of the subscriber's circuit controlling apparatus (VX1 $\mu s$ in normal procedure, VX2 $\mu s$ in simplified procedure is the following three possible cases.

case 1 y>VX1>VX2
case 2 VX1>y>VX2
case 3 VX1>VX2>y

In case 1, since the capacity of the transfer processing by the subscriber's circuit controlling apparatus in the normal procedure is higher than the rate of the control information issued from the central processing device, the order queue buffer 10 is not necessary in the normal state and the microcomputer circuit can directly process the control information.

In case 2, since the rate of the control information issued from the central processing device per unit time is higher than the capacity of transfer processing of the subscriber's circuit control, the order queue buffer is necessary.

The order queue buffer should have such a capacity that it can process the order to each subscriber's circuit in consideration of the simultaneous calling and disconnection when issuance of the control information from the central processing device is most frequent. If the maximum k subscriber's circuits are controlled for one subscriber's circuit controlling apparatus, the number of buffers: 1 can be expressed by the following equation 2.

$$1 \geq \frac{\{X_1 \text{ bytes/order} \times (1 + \gamma) \times V\mu s/\text{byte} - y\mu s/\text{order interval}\}}{X_1 \text{ bytes/order} \times V\mu s/\text{byte}} \times P \text{ order}/CCT \times kCCT \quad \text{EQUATION 2}$$

If the worst case of simultaneous calling/disconnection is repeated, the number of queue buffers which are preset in accordance with the equation 2 may become insufficient since the number of queues increases, resulting in an order which can not be transferred by the subscriber's circuit controlling apparatus (a discarded order). In this case, when the number of queues exceeds a given value $m\mu$, the number of queues can be decreased by shifting the normal procedure, in which the microcomputer circuit performs the state collation and check by execution of the state reading control order after the issuance of the state write control order, to the simplified procedure in which only the state write control order is executed and the collation and check by the state reading is omitted even if the worst case condition persists.

The relationship between the number of queues mt and the congestion continuing period of the t can be expressed by the following equation wherein t1 is a time after $mt = m\mu$.

$$m = \frac{t\mu s}{y\mu s/\text{order}} \frac{t\mu s}{X_1 \text{ bytes/order} \times (1 + \gamma) \times V\mu s/\text{byte}} \quad \text{EQUATION 3}$$
(wherein $m_t \leq m_u$)

$$m = m_t \frac{t_1 \mu s}{X_2 \text{ bytes/order} \times (1 + \gamma) \times V\mu s/\text{byte}} \frac{t_1 \mu s}{y\mu s/\text{order}}$$
(wherein $m_t > m_u$)

Figure 10:
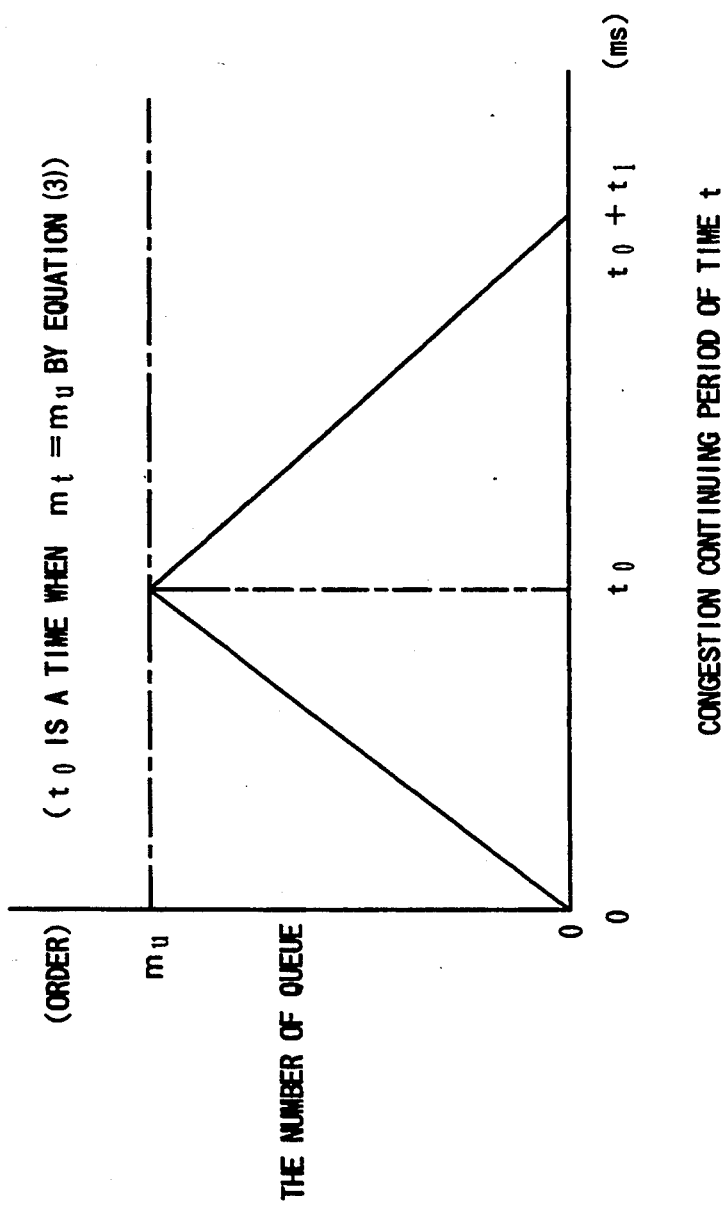
FIG. 10 is a graph showing the relation between the number of order queues and the congestion time period.

The relationship between the congestion continuing period of time and the number of queues is shown in FIG. 10. In FIG. 10, time t0$\mu$s represents the time when the number of queues mt becomes equal to the number of threshold queue number $m\mu$. The control information is processed by the normal procedure before the time t0 $\mu$s and is processed by the simplified procedure after the time t0 $\mu$s.

A case 3 is considered. The number of queues is not decreased even if the normal procedure is shifted to the simplified procedure in the worst case in which simultaneous calling/disconnection is repeated. As a result of this, over flow may occur. In this case, it is necessary to provide the order queue buffer with a sufficient buffer capacity.

In other words, if the number of the threshold queues $m\mu$ at which the normal procedure is shifted to the simplified is preset to a larger number, a long period of time is taken until the queue completely disappears to return to the normal procedure. The number of queues $m\mu$ can be determined from the above mentioned equation so that the service specification of CCITT Q543 recommendations, etc. is satisfied by conducting adjustment including processing period of time of the central processing device in consideration of delay in connection.

The queue value at which the procedure is returned to the normal procedure is newly introduced and is preset at the same value as $m\mu$. The queue number fluctuates around $m\mu$ (=md) when the most busy state lasts in which simultaneous calling/disconnection is repeated. The queue number gradually decreases after the completion of the most busy state. The decreasing speed of the queue number is lower than that in case of md=0. Since processing is performed by the normal procedure in the queue state less than md, the reliability is higher.

In such a manner, presetting of md and $m\mu$ is a compromise between the fast response and high reliability of processing. They can be preset to optimum values by considering call occurrence state in each system and the processing time in other apparatuses.

Subscriber's control order processing which is adaptive to the burst-like order issuance from the central processing device in each system can be performed as mentioned above.

Another approach includes increasing the rate of the order transfer between the subscriber's circuit controlling apparatus and the subscriber's circuit. In this case, a control bus which is connected to the subscriber's circuit control and a plurality of subscriber's circuit cards may be of an unbalanced transmission type using TTL which is advantageous in cost. The transfer rate may be preset in consideration of the operation margin for the delay influence caused by the connection pattern length and reflection, etc.

An approach for preventing the control information from being discarded on switching of systems in the case whose the subscriber's circuit controlling apparatus adopts the dual redundant structure will be described.

Discard of control information may occur due to the fact that the order of the order queue buffer in the ACT system is different from that in the SBY system.

Figure 11:
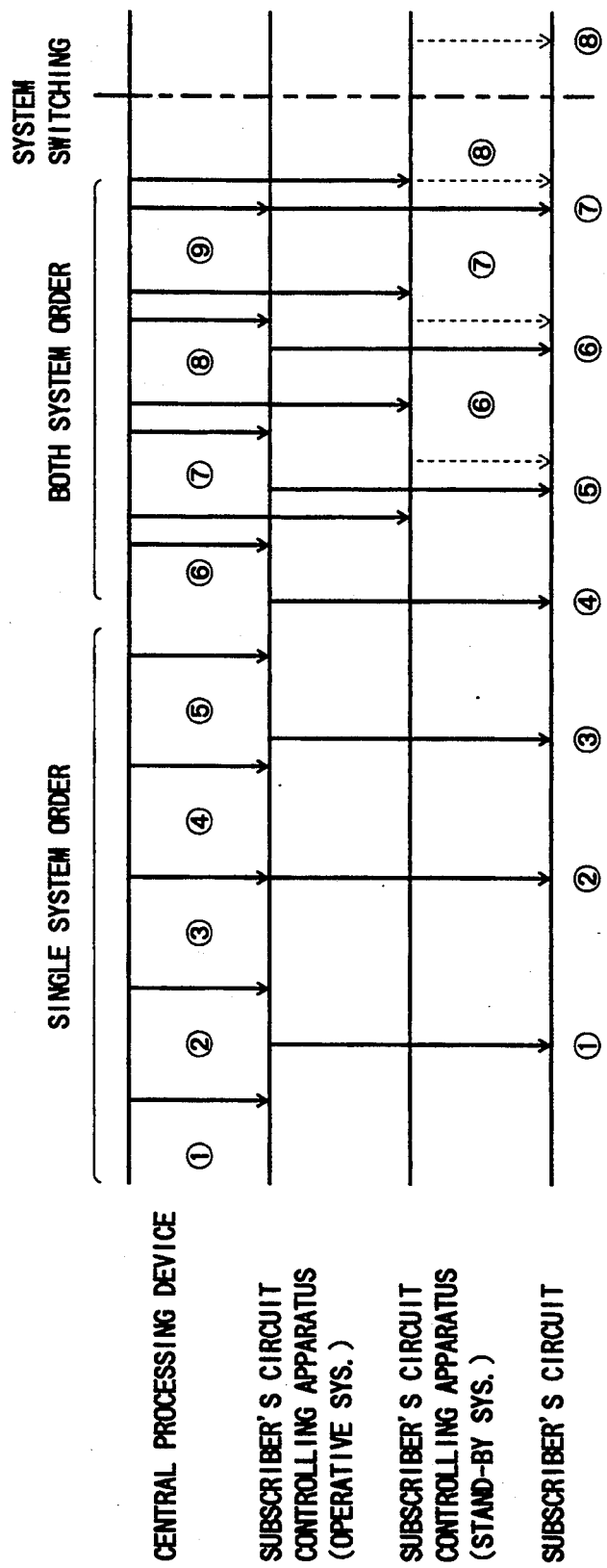
FIG. 11 is an explanatory view showing an order issue model on switching of systems.

The control orders are classified into one sided system order (order issued for the ACT system, mainly read order) and a both sided system order (order issued for both ACT/SBY systems). Processing in the queue buffers in both sided systems is different in a case as shown in FIG. 11. Although the speech path equipment 2 issues orders to both sided systems 0 and 1, the state read order for the subscriber's circuit is issued to only the ACT system. Accordingly, processing in the queue buffers in both systems is different since the order processing in both systems is not synchronized. Since the state read order is issued by only the microcomputer circuit 7 of the order processing unit in the ACT system and is not issued in the SBY system, a difference arises between the orders of both systems. If the state read orders are successively issued, processing in the SBY system is less than that in the ACT system, resulting in a difference between the storage of the queue buffers of systems. If a fault occurs in the ACT system at this time and switching of systems is executed in response to a system switching instruction, order queues which constitute the difference between the storage of the queue buffers of the ACT and SBY systems are lost without being executed. Accordingly, the control state which is held by the host apparatus becomes different from that of the actual subscriber's circuit so that malfunction may occur.

Figure 12:
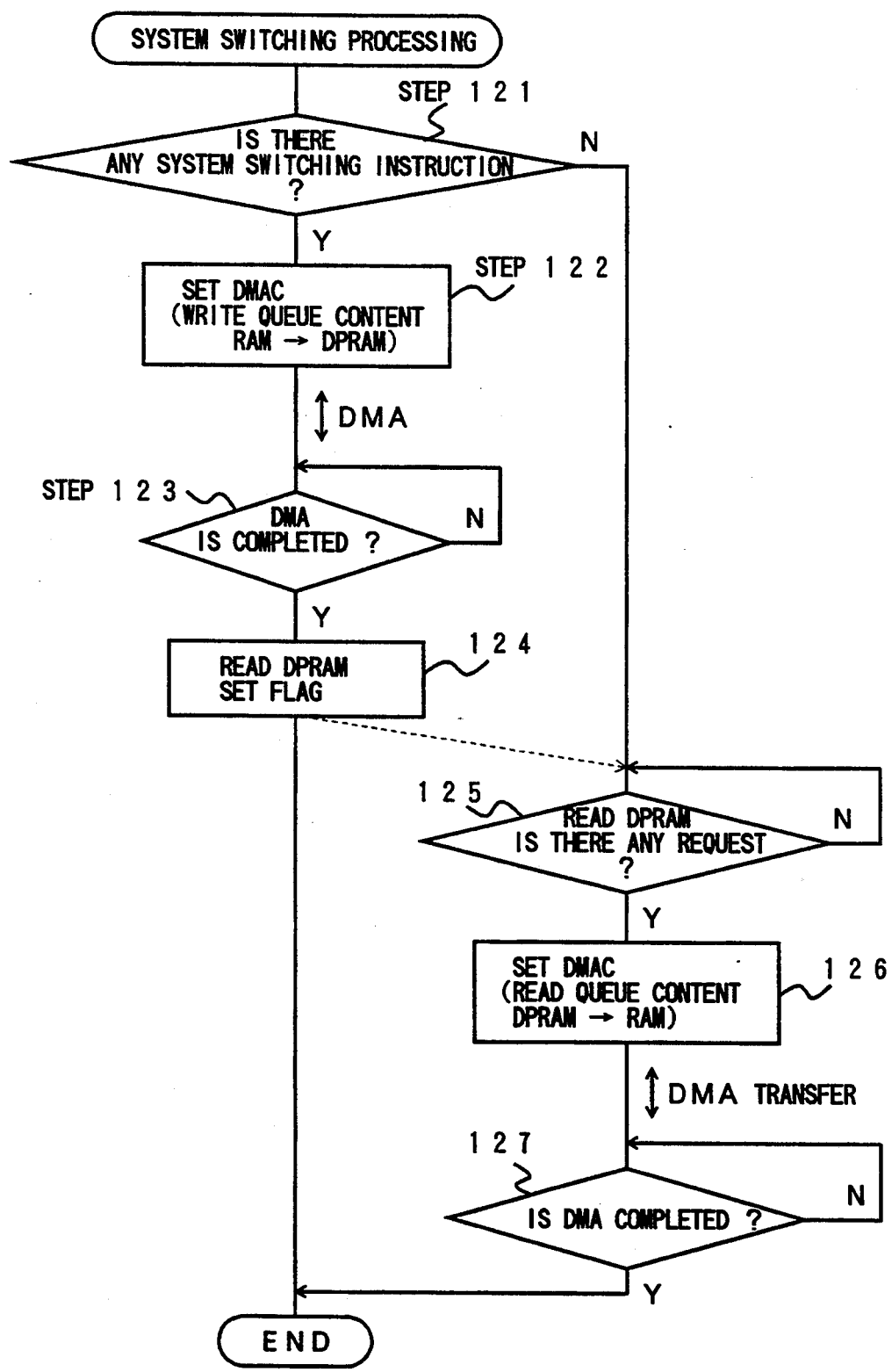
FIG. 12 is a flow chart showing a system switching processing.

Therefore, in the present embodiment, each order processing unit is provided with the DMAC 8, and the dual port RAM circuit 12 and the competition control means 16 are provided between the systems. FIG. 12 shows a flow chart of system switching processing.

In FIG. 12, when system switching is instructed a system is judged whether or not SBY system (step 121), if the system is judged a SBY system, the microcomputer circuit 7 sets the DMAC of the current ACT system (step 122) after it stops order processing. The DMAC 8 DMA transfers all queues in the current ACT system order queue buffer to the dual port RAM. After completion of DAM transfer (step 123), the DMAC sets a request flag in the competition control means 16 (124). On the other hand, in the judgement at step 121 if a system is not SBY system the system is judged a new ACT system, the microcomputer circuit 7 of the new ACT system regularly monitors the request flag in the competition control means 16. If the request flag has been set (step 125), the microcomputer circuit 7 of the new ACT system sets the DMAC 8 of the new ACT system and DMA transfers queues in the dual port RAM to the order queue buffer of the new ACT system (step 127). System switching in which queue discard due to the difference between the order queue buffer is prevented from occurring can be executed by resuming an order processing in the new ACT system.

An equation for determining the DMA transfer time $t\mu s$ is shown by equation 4. In this case, the DMA transfer time is defined as a period of time since the current ACT system reads the queue from the queue buffer and writes it to the dual port RAM until the SBY system reads it from the dual port RAM and writes it to the queue buffer. If the order queue capacity (W bytes) and the transfer time per one byte ($T\mu s/byte$) are known, the DMA transfer time $t\mu s$ can be determined as follows:

$$t\mu s = (W\ bytes \times T\mu s/byte) \times 2 \qquad \text{EQUATION 4}$$

DMA transfer is completed within the above mentioned period of time. The capacity of the queue buffer and the DMA transfer rate can be determined by the above mentioned equation to satisfy the request time for system switching.

A further approach for preventing control information from being discarded includes synchronizing the order processing in both systems with each other. Control is possible so that the number of queue buffers in the ACT system is constantly made equal to that in the SBY system, for example, by eliminating one order queue in the SBY system after execution of the same order is completed in the ACT system.

Operation in a case in which the control information from the subscriber's circuit is received will be described and monitoring of mounting of the subscriber's circuit boards and autonomous initial presetting in the subscriber's circuit control device will also be described.

Figure 5:
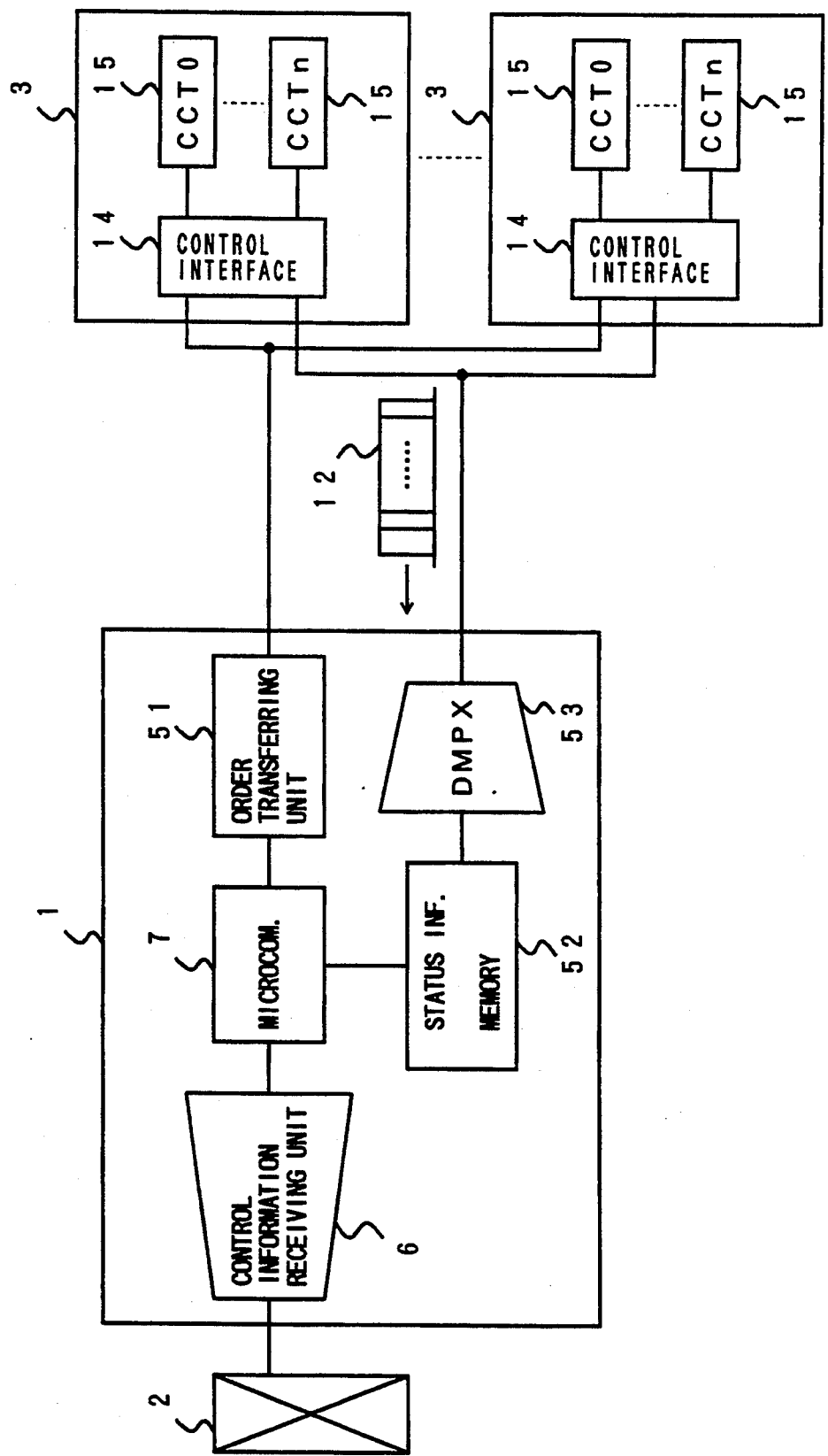
FIG. 5 is a block diagram showing an autonomous initial presetting system in the subscriber's circuit controlling apparatus.
Figure 6:
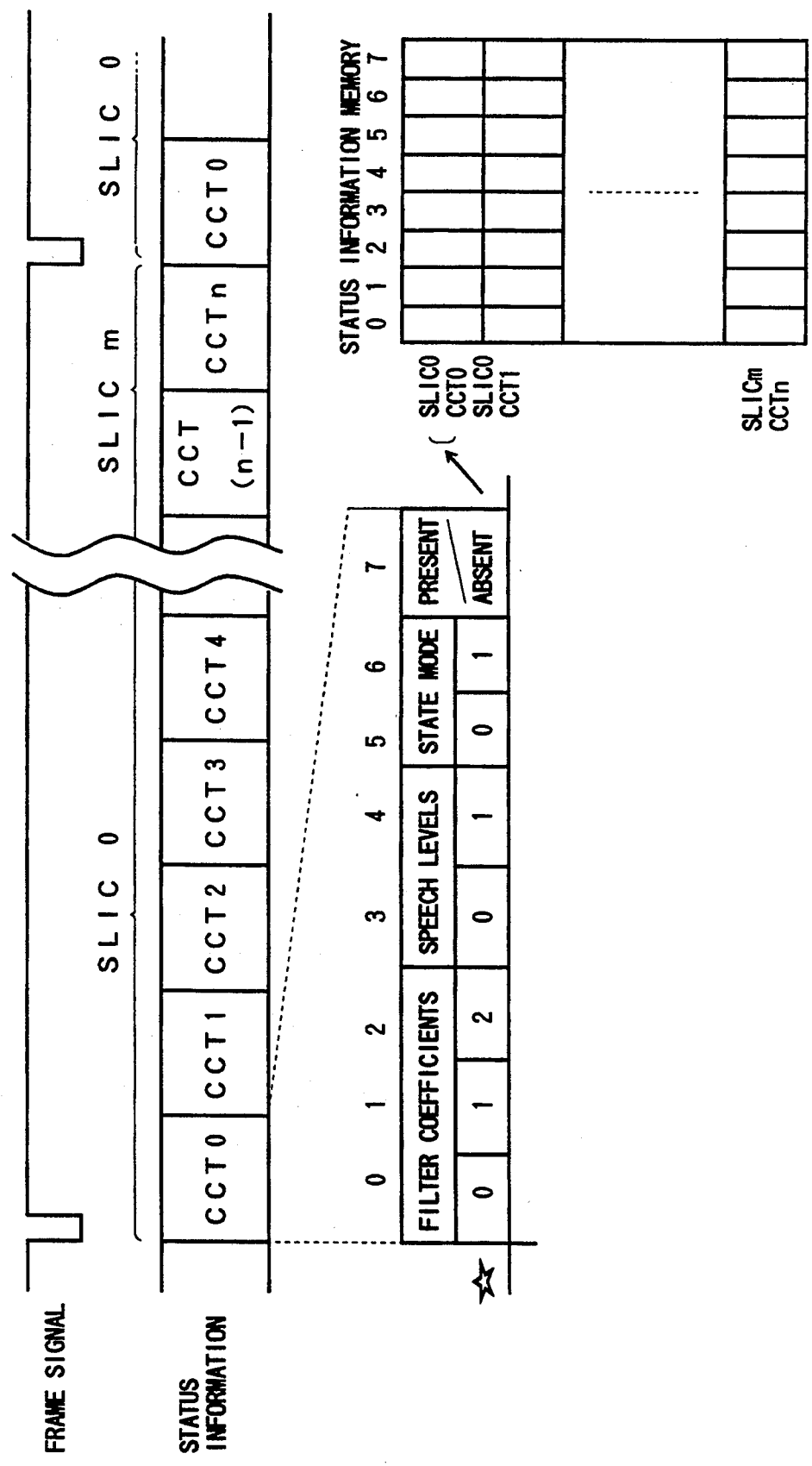
FIG. 6 is a view showing the frame format of status information used on initial presetting.

FIG. 5 shows a block diagram showing the connection in the present embodiment. FIG. 6 shows the frame format of status information which is notification information from the subscriber's circuit and the memory allocation.

In FIG. 5, the switching system comprises a speech path equipment 2 and a plurality of subscriber's circuit controlling apparatuses and a plurality of subscriber's circuits devices 3. Subscriber's circuit control information from the speech path equipment 2 is received by a control information receiving unit 6, which notifies it to a microcomputer circuit 7. The microcomputer 7 controls the subscriber's circuit device via an order transfer unit 51 similarly to the above mentioned embodiment. The subscriber's circuit controlling apparatus further includes a time division multiplexer (DMPX) 53 which receives status information from each subscriber's circuit device and a status information memory 52 for storing therein status information of each subscriber's circuit. In the receiving unit, the DMPX 53 and the status information memory 52 may also be of dual redundant structure.

The subscriber's circuit controlling apparatus controls a plurality of (m+1) subscriber's circuit devices (0 to m) and the DMPX constantly receives status information 12 from each subscriber's circuit device. The status information is timeshared and multiplexed for each subscriber's circuit and the subscriber's circuit controlling apparatus which receives the status information stores the status information in the status information memory 52 after the status information has been demultiplexed by the DMPX 53.

FIG. 6 shows the frame format of the time division multiplexed status information. In FIG. 6, filter coefficients denote the coefficients of a digital filter having a terminating impedance. For example, 3 bit code is preliminarily assigned to the coefficients. Speech levels denotes whether a pad (for example, a transmission loss of 0 dB or 6 dB) is inserted into or omitted from a speech line in the subscriber's circuit. State presetting mode denotes which of the balancing network is preset or not. Present or absent denotes whether or not each subscriber's circuit device board is mounted. A status information memory is assigned to each circuit board (CCT 0 to n) of each subscriber's circuit (SLIC 0 to m) and stores therein the received status information.

In FIG. 6, the subscriber's circuit holds in each circuit board thereof the status information on the filter coefficients, the speech level, the register content, the state presetting mode and whether or not the circuit board is mounted and transfers the status information to the subscriber's circuit controlling apparatus. The subscriber's circuit controlling apparatus receives the status information and writes the status information in an internal status information memory 52 at a given address for updating the same. The status information memory monitors the mounting condition indicating bit. If the mounting condition indicating bit on the circuit board of the subscriber's circuit SLIC has changed to "present" from "absent", the status information memory interrupts the microcomputer 7 to give notification. The microcomputer circuit reads the status information on the filter coefficients, the speech level, the register content and state presetting mode on all circuit boards CCT of the subscriber's circuit device SLIC and consecutively performs the initial presetting operation adapted to the status information.

If all the circuit boards are the same in type and preset contents, the processing period of time can be shortened by simultaneously performing initial presetting in all the circuit boards in an broadcast communication manner.

In accordance with the present invention, the mounting condition of the subscriber's circuit device is constantly monitored and initial presetting operation which is adapted to the different kinds of subscriber's circuit device can be executed and sophisticated functions can be provided by usual configuration.

Figure 7:
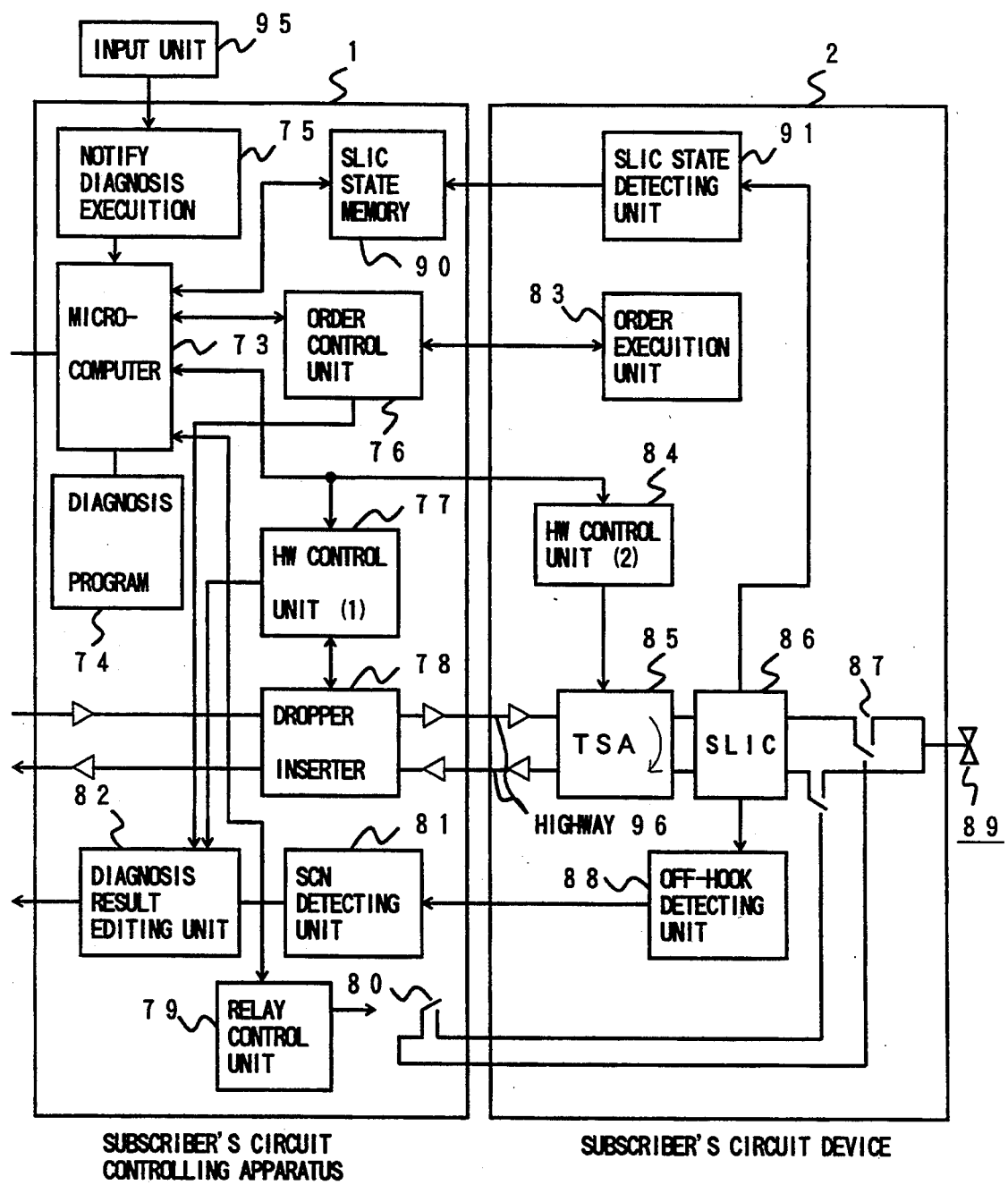
FIG. 7 is a block diagram showing an autonomous diagnostic function of the subscriber's circuit controlling apparatus.

The subscriber's circuit controlling apparatus having a diagnostic function will be described with reference to FIG. 7 showing a block diagram of the diagnostic function of the present embodiment.

In FIG. 7, the subscriber's circuit controlling apparatus 1 comprises a microcomputer 73 and a diagnostic program 74, an order control unit 76 which is test control means for generating and detecting test control signals, an HW control unit 84 and a scan information detecting unit 81.

The subscriber's circuit controlling apparatus 1 is connected to each subscriber's circuit device via the above mentioned common control bus. Test data are transferred therebetween via the common control bus similarly to other control orders. In FIG. 7, flows of test data are directly represented by lines. Highways 96 are data signal lines and time division multiplexed. A time slot (TS) is desirably assigned to each subscriber's circuit device.

A diagnostic execution notifying unit 75 accepts an instruction for starting diagnosis from a maintenance person and interrupts the microcomputer 73 for notification. If the microcomputer 72 receives a notification, it loads a diagnostic program therein and executes the program of each diagnostic menu of the diagnostic program 74. The present diagnostic operation can be executed regardless of whether or not the subscriber's circuit controlling apparatus and the subscriber's circuit device are incorporated (operated) into the system. Prior to incorporation into the system, the state information is transferred from the SLIC status detecting unit 91 of the subscriber's circuit device to the SLIC state information memory 90. The microcomputer 73 accesses to the SLIC status information memory 90 for identifying the using state of each subscriber's circuit device and executes diagnosis test for only the subscriber's circuit device which is not in use. The diagnostic menu includes three tests as follows:

(1) Order issue test
(2) Highway returning conduction test
(3) Off-hook detection test Operation in each test will be described.

(1) The order issue test examines whether or not the subscriber's circuit correctly performs an operation corresponding to an control order which is issued normally from the subscriber's circuit control.

In the order issue test, the microcomputer 73 first gives an instruction to an order control unit 76. The order control unit 76 sequentially issues a control order to write the state of all circuits for operating order execution unit 83 of each subscriber's circuit and then issues a control order for reading the states of all circuits for checking the order execution contents and examines whether or not the control order is executed normally.

(2) The highway (HW)(data signal line) returning conduction test is conducted via an HW control unit 77, an HW control unit 84, a dropper inserter 78, and an HW returning loop making unit (TSA) 85. In response to an instruction from the microcomputer 73, the HW control unit 84 instructs the HW returning loop making unit (TSA) 85 to make a returning loop of the time slot (TS) to be tested on the highway. The time slot (TS) to be tested means a time slot assigned on the highway of the subscriber's circuit to be tested. The HW returning loop making unit (TSA) 85 returns the time slot (TS) to be tested. The loop HW control unit 77 inserts a test pattern into the TS to be tested by means of the dropper inserter 78. The dropper inserter 78 picks up a test pattern on the returning TS to be tested and the loop HW control unit 77 confirms the conduction through the returning highway TS by comparison and collation. The present test can be executed in TS units for all TSs.

(3) In the off-hook detection test, determination as to whether or not off-hook is correctly detected in the subscriber's circuit is made by using a relay control unit 79, a loop making relay 80, a scan (SCN) information detecting unit 81, an SLIC (subscriber's circuit) 86, a test lead-in relay 87 and an off-hook detection unit 88. In order to conduct the off-hook detection test, a test lead-in line for driving the relay is provided separately from the control bus.

After the relay control unit switches a position of the test lead-in relay to a test position in response to an instruction from the microcomputer 73, it turns the loop making relay 87 on to make a pseudo loop. When the off-hook detection unit detects that the loop is detected by the SLIC 86, it is informed to the scan information detecting unit 81 so that the off-hook detecting capability of the SLIC 86 can be confirmed.

All the results of diagnosis tests (1) to (3) are informed to a diagnosis result editing unit 12 from the order control unit 76, the HW control unit 84 and the scan information detecting unit 81. Display of the results on a display (LED) included in the subscriber's circuit control enables the maintenance person to recognize it.

In accordance with the present embodiment, the subscriber's circuit under control of the subscriber's circuit controlling apparatus is diagnosed by the usual configuration before and after the incorporation into the system for providing improved capabilities.

In accordance with the present invention, reliability of the control system can be advantageously enhanced since the subscriber's circuit device is capable of transferring orders without erroneous recognition even if noise occurs due to insertion or removal of a hot-line job to or from a control bus between the subscriber's circuit controlling apparatus and each subscriber's circuit.

Missing of the control information which otherwise occurs when the capacity of processing the control information is limited can be prevented.

In accordance with the present invention, a subscriber's circuit controlling apparatus having a high quality duplex redundant structure can be provided since system switching can be made without discarding order queues and without any necessity of synchronized processing of order queues among systems.

What is claimed is:

1. A switching system including a plurality of subscriber's circuit devices connected to terminals and having capabilities related with controlling of operation of the terminals, one or more host apparatuses having a capability of switching information from the terminals in accordance with the destination of the information for outputting control information; and a plurality of subscriber's circuit controlling apparatus connected with said host apparatuses and said subscriber's circuit devices for outputting control orders each corresponding to the control information from said host apparatuses to control said subscriber's circuit devices in accordance with said control orders;

wherein each of said subscriber's circuit controlling apparatus includes an order processing unit which analyzes received control information from said host apparatuses and compares said received control information with the last received control information and outputs one of said control orders corresponding to the control information to the subscriber's circuit devices when there is disagreement between said received control information and said last received control information;

said order processing unit transmits said one of said control orders a number of times;

said subscriber's circuit devices receive said one of said control orders from said order processing unit plural times and collate said one of said control orders for outputting a fault report to said order processing unit when said one of said control orders are inconsistent; and said order processing unit retransmitting said one of said control orders when it receives said fault report from said subscriber's circuit devices.

2. A switching system as defined in claim 1 and further including dedicated alarm lines which connect said subscriber's circuit devices with said subscriber's circuit controlling apparatuses for transmitting said fault report.

3. A subscriber's circuit controlling apparatus which is connected to subscriber's circuit devices connected with terminals and having a capability relating to controlling of operation of terminals and a host apparatus which has a capability of switching information from the terminals in accordance with the destination of the information to output control information for outputting control orders each corresponding to the control information from said host apparatus to control subscriber's circuit devices in accordance with said control orders, said subscriber's circuit controlling apparatus further includes an order processing unit which analyzes received control information from said host apparatuses and compares the received control information with a last received control information for outputting one of said control order corresponding to the control information to the subscriber's circuit devices when said received control information and said last received control information disagree;

said order processing unit being adapted to transmit a read control order for reading the control order received by the subscriber's circuit device and determining whether or not the response of the read control order from the subscriber's circuit device agrees with the transmitted control order and retransmitting said one of said control orders if there is disagreement therebetween.

4. A subscriber's circuit controlling apparatus as defined in claim 3 in which said order processing unit reports a fault to said host apparatus when said order processing unit retransmits said one of said control orders a predetermined number of times.

5. A subscriber's circuit controlling apparatus as defined in claim 3 in which said order processing unit further includes an order queue buffer for storing therein control information from said host apparatus.

6. A subscriber's circuit controlling apparatus as defined in claim 5 in which said order processing unit has a duplex redundant structure including operative and stand-by systems and said subscriber's circuit controlling apparatus further includes a dual port memory between the operative and stand-by systems;

said dual port memory accumulates therein control information of an order queue buffer of the operative system on switching from the operative system to the stand-by system;

said order processing unit further includes a memory controller for controlling the transmission of the control information from the order queue buffer to the dual port memory and vice versa.

7. A switching system including a plurality of subscriber's circuit devices on which one or more subscriber's circuits connected to terminals are mounted; one or more host apparatuses having a capability of switching information from the terminals in accordance with the destination of the information for outputting control information; and a subscriber's circuit controlling apparatus connected with said host apparatuses and said subscriber's circuit devices for controlling said subscriber's circuit devices for outputting control orders each corresponding to the control information from said host apparatuses to control said subscriber's circuit devices in accordance with said control order;

wherein each of said subscriber's circuit controlling apparatus includes an order processing unit which analyzes received control information from said host apparatuses and compares said received control information with a last received control information and outputs one of said control orders corresponding to the control information to the subscriber's circuit devices when said received control information disagreed with said received control information; and said order processing unit monitors mounting of the subscriber's circuits on said subscriber's circuit devices and controls a predetermined initial presetting corresponding to the type of subscriber's circuit when the mounting is detected.

8. A switching system as defined in claim 7 in which said order processing unit further includes diagnosing means for testing said subscriber's circuit devices for diagnosis thereof and an input unit for starting said diagnosing means in response to an instruction to start the diagnosis test.

9. A switching system as defined in claim 8 in which said diagnosing means issues one of said control orders to said subscriber's circuit device and thereafter transmits a read control order for reading said one of said control orders which is received by said subscriber's circuit device and determines whether or not the response to the read control order from the subscriber's circuit device agrees with the transmitted control order.

10. A switching system as defined in claim 8 in which said diagnosing means instructs said subscriber's circuit device to return a data signal line and transmits a test pattern via the data signal line to perform a conduction test of the data signal line.

11. A switching system as defined in claim 8 in which said diagnosing means further includes a test lead-in line for driving a relay between said subscriber's circuit devices and said subscriber's circuit controlling apparatuses;

said subscriber's circuit device includes a loop making relay to connect the device to said test lead-in line and a off-hook detecting means for detecting the driving of the loop making relay to report the off-hook state;

said diagnosing means drives said loop making relay via the test lead-in line to perform the off-hook detection test in response to an off-hook report from said off-hook detecting means.

12. A switching system as defined in claim 1 in which said order processing unit reports a fault to said host apparatus when said order processing unit retransmits said one of said control orders a predetermined number of times.

13. A switching system as defined in claim 12 in which said subscriber's circuit controlling apparatus has said order processing unit having a duplex redundant structure including operative and stand-by systems; and said host apparatus instructs said subscriber's circuit controlling apparatus to switch between the operative system and the stand-by system upon receiving said fault reports from said order processing unit.

14. A subscriber circuit controlling apparatus as defined in claim 5 in which said order processing unit disables the transmission of said read control order when the quantity of the control information stored in said order queue buffer reaches a predetermined quantity.

* * * * *